Oct. 15, 1968   R. M. ALTMAN ET AL   3,405,994
VARIABLE INCIDENCE TYPE SLIT LAMP MECHANISM
Filed Sept. 14, 1964   2 Sheets-Sheet 1

INVENTORS
RICHARD M. ALTMAN
RONALD K. KIMMEL
BY Frank C. Parker
ATTORNEY

United States Patent Office 3,405,994
Patented Oct. 15, 1968

3,405,994
VARIABLE INCIDENCE TYPE SLIT LAMP MECHANISM
Richard M. Altman, Brighton, and Ronald K. Kimmel, Scottsville, N.Y., assignors to Bausch & Lomb Incorporated, Rochester, N.Y., a corporation of New York
Filed Sept. 14, 1964, Ser. No. 396,273
10 Claims. (Cl. 351—14)

ABSTRACT OF THE DISCLOSURE

An illuminating system for projecting into an eye to be examined a narrow and focused beam of light, said system including mirror means which are moved rectilinearly along a portion of the optical axis across the entrance face of the objective lens so that the focused beam which is produced by the objective lens may be deviated by the lens in an axial plane to change the angle of incidence of the beam on the eye.

---

The present invention relates to slit lamp devices used for ophthalmic examinations of the eye and more particularly it relates to improvements in the illuminating system thereof.

In using a slit lamp device for the ophthalmic examination of a patient's eye, the practitioner finds it very advantageous to direct the focused thin illuminating beam into the eye at various angles of incidence. Up to the present time, the problem has been met in the prior art by pivotally mounting the entire illumination mechanism for angular movement relative to the microscope viewing instrument, the pivoting motion being effected in a vertical plane which passes through the focal point of the focused illuminating beam.

Such prior art devices inherently involve some serious disadvantages, one of which is the comparatively heavy and bulky mechanism required to pivotally support the entire illumination assembly. Further undesirable features of the prior art concern the high cost of construction and massiveness of the heavier mechanism used and not the least of the objections thereto is the difficulty of designing an aesthetically pleasing appearance for such an instrument.

In view of the aforementioned difficulties, it is an object of the present invention to provide novel means for directing upon the eye of a patient at various angles of incidence a focused illuminating beam of light having a large numerical aperture during an ophthalmic microscopic examination.

It is a further object to provide such a device by the use of lightweight and low-cost mechanism which is unobtrusive and of good appearance, which furthermore is simple in structure and easy to maintain in good reliable working order but nevertheless capable of a performance which meets all requirements.

A further object is to provide in a slit lamp mechanism a variable incidence illumination for a patient's eye, the moving parts of the mechanism for effecting the variable incidence being enclosed for protection against dust and foreign matter and for security against rough or careless handling, said parts being comparatively small and compact.

Further objects and advantages are to be found in the construction, combination and arrangement of the parts of the slit lamp device, a description of which is found in the specification herebelow taken together with the accompanying drawings, wherein.

The variation in the combination and form of the structures constituting the present invention covers a considerable range, and several forms are shown and described in detail.

Figure 1:
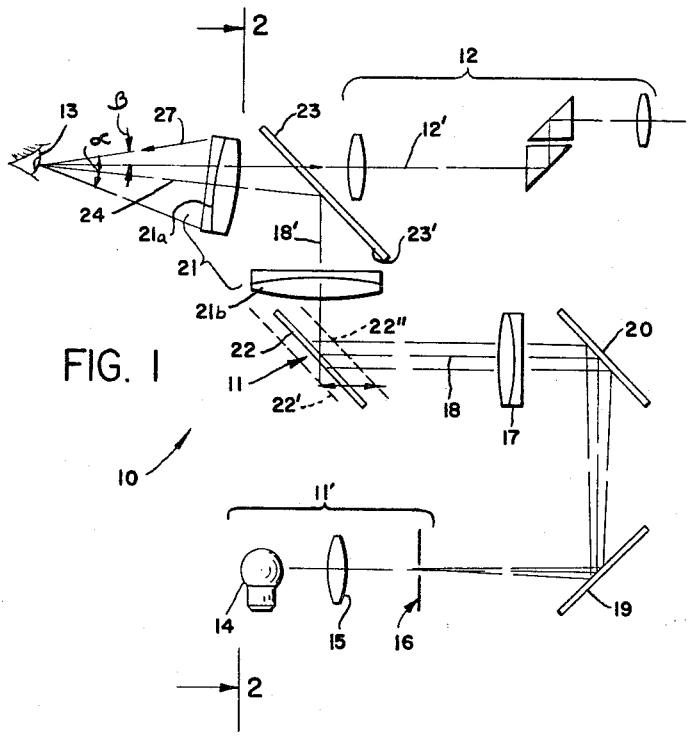
FIG. 1 is an optical diagram representing one form of the present invention.

A preferred form of the present invention is shown in FIG. 1 wherein the numeral 10 indicates generally a slit lamp device. Combined in said device 10 is an illumination system of the centered type designated generally by numeral 11, and an optically aligned viewing device designated generally by numeral 12 such as a binocular microscope. "Centered type" refers to optical systems having all its lenses 21a and 21b on a single axis. These two functional groups of optical parts are mounted in correct operational alignment with each other for all required motions in a suitable supporting frame or casing, not shown. All forms of the invention are characterized by a combination of optically aligned parts which are: a light source, condenser lens, a slit mechanism, a collimation lens for the beam passing the slit mechanism, a rectilinearly movable mirror which varies the position of the beam, an objective lens means focused on an eye to be examined, and a viewing device for viewing the eye through its objective lens.

With reference to FIG. 1 of the drawing, an eye to be examined is indicated by numeral 13 and the aforesaid illuminating system 11 is provided for projecting into the eye a relatively small focused beam of light.

Figure 3:
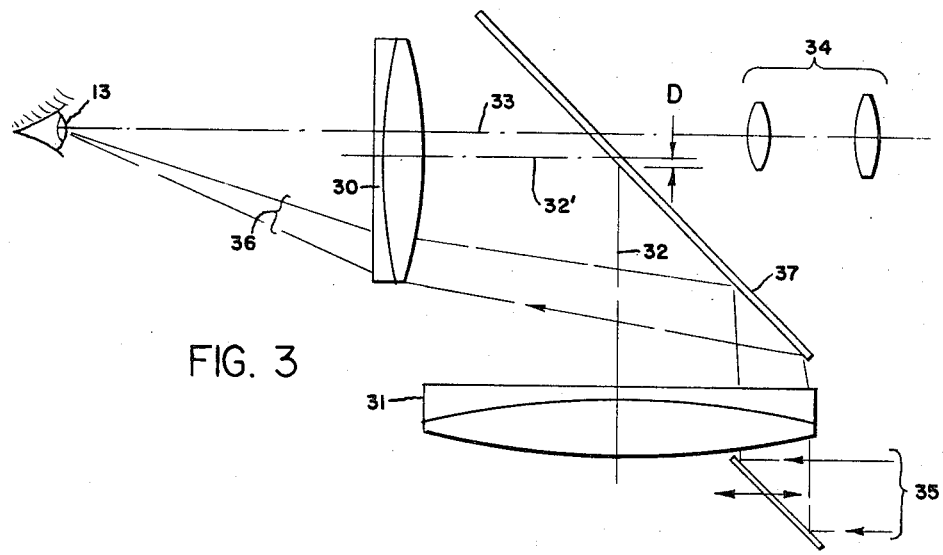
FIG. 3 is an optical diagram showing a variation of form of certain working parts of FIG. 1.
Figure 4:
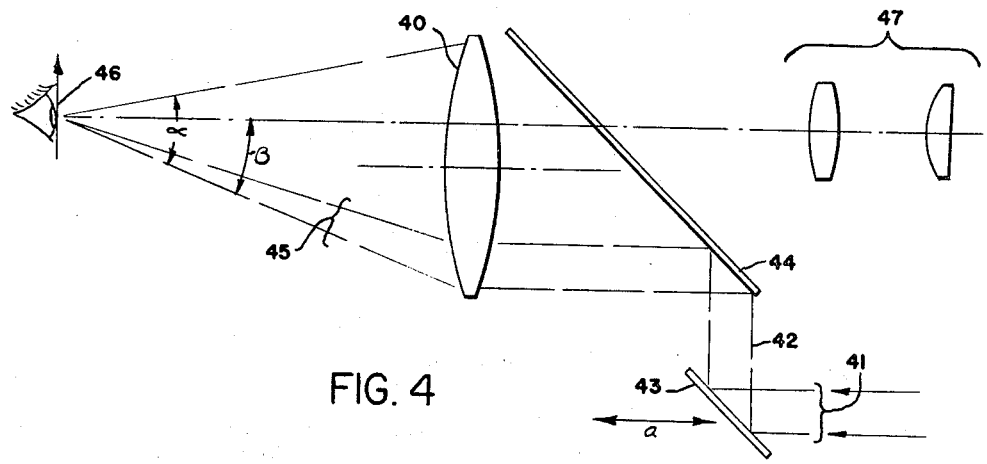
FIG. 4 is a view similar to FIG. 3 of another form of said working parts.
Figure 5:
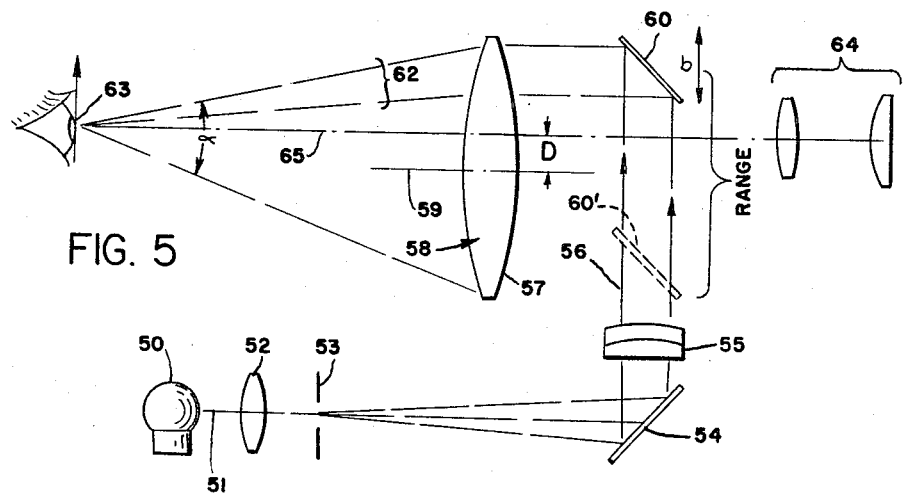
FIG. 5 is an optical diagram illustrating still another form of the persent invention.

According to preference, the illumination system 11 may be of the optically centered type as shown in FIG. 1 or the decentered type as shown in FIGS. 3, 4 and 5. As shown in FIG. 1, said illumination system 11 comprises a lamp 14 and a condenser lens 15 which concentrate the emitted light as a slit mechanism 16. The slit mechanism or blade is adjustably constructed to form a secondary light source of desired narrow shape and size and the beam emanating from the slit is collimated by a collimating lens 17.

For reducing the overall dimensions of the illuminating system, the optical axis 18 is bent back upon itself by the use of a pair of inclined flat mirrors 19 and 20. The parallel beam projected by the collimating lens 17 is focused by an objective lens 21 upon the eye 13 to be examined.

A feature of this form of the invention is the use of a two-part objective lens having a front lens member 21a and an axially spaced rear lens member 21b which is preferred to the use of a single lens. Such an objective lens structure provides the advantage of a considerable excess of numerical aperture which is used for improving the variable incidence angle of the beam which illuminates the eye being examined. For a purpose to be explained subsequently, lenses 21a and 21b are positioned about crosswise adjacent to each other and are mutually optically aligned on a bent optical axis.

According to the present invention, novel means are provided for varying the angle of incidence of the illuminating beam upon the eye 13, said means generally speaking with regard to all forms of the present invention involving the use of a flat mirror which is located obliquely to the optical axis of the illumination system so as to reflect the beam laterally, said mirror being movable rectilinearly along either the portion of the beam which is incident on the mirror or rectilinearly along the reflected beam while maintaining the obliquity of the mirror constant. The rectilinear motion of said movable mirror in all forms of the invention results in displacing the illuminating beam in a direction along the entrance surface of the objective lens, or more accurately, crosswise to the projected space lying adjacent to said entrance lens surface. Since the crosswise area of the beam is small relative to the area of said entrance lens surface, the emergent beam may be refracted at different radial zones of the objective lens resulting in a considerable range in deviation of the focused beam and consequently the incidence angle on the eye.

Figure 2:
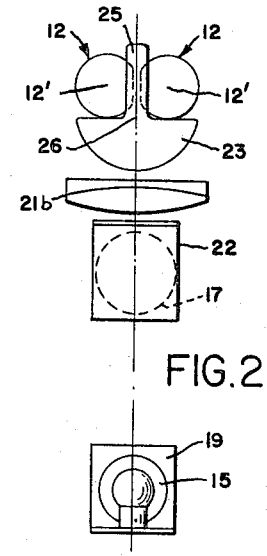
FIG. 2 is a sectional view taken on the line 2—2 of FIG. 1.

In one form of the invention, as shown in FIGS. 1 and 2, the aforesaid movable mirror is designated by numeral 22 and it is moved rectilinearly in the direction of the axis 18 between the extreme positions 22' and 22" without changing the angular position thereof. From the mirror 22, the collimated beam is projected through lens 21b onto the flat mirror 23 which is preferably formed from glass having an opaque reflective coating 23' thereon, and said mirror is held in a stationary oblique position across the entrance face of the objective lens 21a so as to reflect said beam therethrough. Since the mirror 23 is opaque, the viewing device 12 must look around the mirror and accordingly it is preferred to use a binocular instrument such as a binocular microscope in which the viewing lines of sight 12' straddle the mirror 23. To facilitate this arrangement, the upper portion 25 of mirror 23, shown in FIG. 2, is cut away in width so that the upper portion of the mirror is substantially equal to the transverse dimensions of the projected beam of light. Since this illuminating system is of the centered type, the flat mirror 22 is held at a slight angle to mirror 23 so that the axis 18' is reflected in the direction of the lens axis 24. Due to the above-described movement of mirror 22, the beam of light is caused to strike the mirror face 23' at various locations along the vertical axis 26 as shown in FIG. 2. From the mirror 23, the beam is deviated through the objective lens member 21a which focuses the beam upon the eye 13.

The important feature of the above-described optical parts is that the mirror 22 is moved rectilinearly only and deviates the focused beam 27 through a range of incidence angles α of at least 20°. This method of operation results advantageously in a great simplification in support mechanism and elimination of heavy and bulky journals and bearings.

As aforesaid, the use of two objective lenses 21a and 21b provides the advantage of a comparatively large relative aperture for the illumination system. Such a large relative aperture is effected by positioning a comparatively small lens 21a much closer to the patient's eye than heretofore so as to pass rays through a wide incidence angle, and by locating a comparatively large aperture-limiting lens on a lateral axis 18' out of the viewing space confronting the eye. In this manner the objective lens 21b may be chosen as large as necessary to meet a large variable incidence requirement for angle α which is set by lens 21a.

With regard to the operation of the invention in the form of the invention shown in FIGS. 1 and 2, energization of lamp 14 causes the focused beam 27 to appear. The beam 27 is focused on the patient's eye 13 by adjusting the distance between eye 13 and objective lens 21a as observed in the viewing device 12 by the operator along the axis 12'. During the course of the examination the incidence angle β (FIG. 1) of the focused beam 27 is adjusted to any desired value in the vertical plane which includes the axis 24 by moving the mirror 22 in a straight line in the direction of the arrow between the dotted line positions 22' and 22" resulting in different interior areas of the eye 13 being illuminated.

It is within the purview of the present invention to provide a decentered optical system. As shown in FIG. 3, a two-part objective lens system consisting of a small positive lens 30 and a large positive lens 31 which do not have their optical axes 32 and 32' mutually aligned. The portion 32' of the optical axis extends at right angles to the upright portion 32 and is decentered by a distance D. A collimated beam of light 35 is shown in FIG. 3 and the rays are traced through the objective lens system to illustrate how the objective lenses 30 and 31 act cooperatively and successively to form the focused beam 36. The intervening deviation mirror 37 between lenses 30 and 31 is opaque and is cut away to permit improved binocular vision the same as shown in mirror 23 of FIG. 2.

In FIGS. 4 and 5 other forms of the invention are shown involving the use of a single objective lens 40 which has the same focal length as the objective lens system 21 of FIG. 1. As aforesaid, the total incidence angle range α for a single lens is somewhat smaller than for the double lens objective but the lamp, slit mechanism and collimating mechanism are the same as shown in FIG. 1 and are not illustrated in FIG. 4.

The collimated beam 41 is reflected vertically along the beam portion 42 by a flat mirror 43 and the portion 42 is reflected in an axial direction through the objective lens 40 by an inclined and stationary flat mirror 44. Objective lens 40 focuses the collimated beam of light as shown at 45 onto the eye 46. The illuminated eye is observed by the use of a suitable microscope viewing device 47 and/or photographic device.

For the purpose of varying the angle of incidence of the focused beam 45 through the angle β, the mirror 43 is slidably mounted to move back and forth in the direction of the arrow a similarly in structure and operation to the form of the invention shown in FIG. 1.

With regard to the direction in which the movable mirror shown in FIGS. 1, 3 and 4 shall be moved, the feature of the variable incidence angle β may be achieved effectively by moving said movable mirror rectilinearly in a direction which is at 90° to or crosswise to the direction specified and indicated in the drawings. It is quite apparent that a vertically movable mirror would need to be increased in its vertical dimension more than mirrors 22 and 43 corresponding to the amount of movement necessary to achieve the required range of incidence angle α.

Another form of the invention is shown in FIG. 5 wherein a lamp 50 is aligned on an axis 51 with a condensing lens 52 which is focused at lens 58. Light passing the slit mechanism 53 is reflected upwardly by the mirror 54 and is subsequently collimated by a collimator lens 55. The collimated beam 56 is directed across the entrance face 57 of an objective lens 58 substantially parallel to its optical axis 59.

In the collimated beam 56 is located a flat mirror 60 which is inclined thereto so as to direct said beam parallel to the axis 59 into an objective lens 58. A focused beam 62 is projected by the objective 58 upon the patient's eye 63. For observing the eye, a microscope viewing device 64 is provided having an optical axis 65 which is aligned with said eye 63 and may be offset from the axis of the objective lens 58 to achieve a minimum diameter of objective lens.

According to this form of the invention, the mirror 60 is movably mounted for rectilinear motion in a vertical plane across the entrance face 57 of the objective lens in alignment with the collimated beam 56 whereby the beam may be reflected through different radial zones of said lens along said plane. The lower position of the mirror 60 is indicated by dotted lines at 60'. The resultant focused beam 62 is therefore projected upon the eye 63 at an incidence angle which is variable throughout a considerable range of angle represented by α.

It is necessary to restrict the crosswise dimension of mirror 60 sufficiently to avoid gross obstruction of the field of view of the microscope device 64 which is a binocular instrument as shown in FIG. 2.

As a further modification, the mirror 44 of FIG. 4 and mirror 60 of FIG. 5 may be formed from glass which has a semi-transmitting layer formed thereon whereby the eye is seen through the mirror. In this modification the dimensions of the mirror are not governed by a consideration of the obscuration of any part of the field of the viewing instrument.

As aforementioned in another modification, the mirror 60 may be moved in a direction at right angles to the direction of arrow *b* and still effect the variable deviation of incident beam 62, the principal requisite being that it is rectilinear motion. Such a motion of the mirror 60 would require a mirror large enough to match the objective lens aperture if full range of incidence angle α is to be obtained and would be somewhat advantageous in the case of the semi-transmitting mirror (not shown).

It will be perceived from the preceding disclosure that there is here provided a slit lamp device which is light-weight, compact and durable in construction, and which is simple and reliable in operation in fulfillment of the stated objects of this invention, and although only certain forms of the invention are shown and described in detail, other forms are possible and changes and modifications may be made in the combination and arrangement of the operating parts without departing from the spirit of the invention as defined in the claims herebelow.

What is claimed is:

1. In an illuminating system for a slit lamp used for ophthalmic examinations, the combination of
    objective lens means which are aligned with an eye to be examined, the eye being placed substantially at the focal point of said means,
    a light source, a slit mechanism and a collimating lens optically aligned in the order named with said objective lens means to project a narrow beam of collimated light through said lens means, and
    means for varying the angle of incidence of that transmitted portion of said beam which is focused by the objective lens means, said varying means including a flat mirror located obliquely at a constant angle to and on the optical axis at the point of intersection of a portion of said axis which is incident on the mirror and another axis portion which is reflected by the mirror, said mirror being movable solely rectilinearly along one of said portions of axis and crosswise to the other said portion in such a manner that the reflected portion of the beam is caused to shift laterally of said axis while retaining its direction,
    whereby the beam may be refracted by different radial zones in the objective lens means resulting in the focused beam striking the eye at various angles of incidence.

2. An illuminating system for a slit lamp device which is used for ophthalmic examination, said system being characterized by the combination of
    objective lens means which are aligned with an eye to be examined and which is placed substantiallly at the focal point of said means,
    a light source, a slit mechanism and a collimating lens optically aligned in the order named with said objective lens means to project a narrow beam of collimated light through said lens means, and
    means for varying the angle of incidence of that portion of said beam which is incident on the eye including a beam deviating mirror which is positioned obliquely to the optical axis at a constant angle thereto and is movable solely rectilinearly along the portion of the beam coming from said collimating lens and transversely of the projected area in front of the aperture of the lens means in such a manner that the beam may be caused to strike the entrance surface of the lens means at various elevations at a radial distance which results in the emergent beam being deviated at various angles of incidence to the eye.

3. An illuminating system for a slit lamp according to claim 1 further characterized by the objective lens means being composed of
    a front positive lens and a rear positive lens which are axially spaced from each other and are individually located on portions of the optical axis which are approximately normal to each other and said means including a deviation mirror therebetween at the intersection of said portions of axes, said lenses together having a focal length equal to the distance from the front lens to the patient's eye and serving to focus the collimated beam on said eye and the front lens being smaller in diameter than the rear lens so that visibility of the operator around said front lens is improved while maintaining a high value of relative aperture.

4. An illuminating system for a slit lamp according to claim 2 further characterized by said mirror being movable rectilinearly along said optical axis across and adjacent to the entrance surface of said rear lens.

5. An illuminating system for a slit lamp device which is used for ophthalmic examination, said system being characterized by the combination of
    objective lens means which are aligned with and are focused upon an eye to be examined,
    means including a lamp and condenser optically aligned with a slit device for projecting a relatively small and narrow collimated beam of light into said lens means in an axial direction, and
    a first and a second deviation mirror located in sequence obliquely in said beam of light adjacent to said objective lens means, one of said mirrors being inclined to and located adjacent to the entrance surface of said lens means and being movable in a rectilinear manner along said beam and across said surface in a direction normal to the optical axis which intersects said surface, whereby the movable mirror causes the beam to be reflected through said entrance surface at a variable radial distance from the axis of said surface, said first and second mirrors being situated obliquely to said beam and substantially parallel to each other, so that the beam strikes the entrance surface at various radial distances from its axis in a vertical plane resulting in the beam emerging from said lens means at various angles of incidence onto said eye.

6. An illuminating system for a slit lamp device according to claim 4 further characterized by said objective lens means consisting of a front lens and a rear lens which together control the numerical aperture and focal length of the system, the front lens member nearest to the eye to be examined being of smaller size than the rear lens so as to obtain increased visibility in the region surrounding said front lens while maintaining a sufficient working distance away from the eye,
    the rear lens being positioned between said first mirror and the other of said two mirrors on a vertically directed portion of the optical axis, the size of the rear lens being much larger than the front lens to provide a comparatively large numerical aperture for said system.

7. An illuminating system for a slit lamp device used for ophthalmic examination of eyes, said system comprising
    means including two closely spaced blades forming a slit mechanism for projecting a relatively small narrow beam of light,
    a collimating lens optically aligned with said mechanism at its focal length from said slit mechanism to collimate said beam,
    an objective lens optically aligned with said collimating lens so as to receive said collimated beam and focus said beam on an eye to be examined, a flat mirror positioned obliquely in optical alignment with said collimating lens and in the collimated portion of said beam so as to deviate the beam laterally thereof, and another flat mirror positioned in the portion of the beam which is deviated laterally, said mirror being parallel to the first mirror so as to deviate said beam to its previous direction and offset thereto, one of said mirrors being located adjacent to and across the entire diameter of the entrance surface of said objective lens, and the other one of said mirrors being movable rectilinearly substantially parallel to the axis of said collimated beam which is incident thereon, whereby the beam is caused to be incident on the entrance surface of said objective lens at different radial distances away from the axis thereof which causes the beam to be refracted by the objective lens at different incidence angles into said eye.

8. An illuminating system for a slit lamp device which is used for ophthalmic examination, said system comprising a lamp, a condenser lens and a slit mechanism optically aligned therewith and having two closely spaced blades for forming a relatively small narrow beam of light, a collimating lens optically aligned with said slit mechanism at a distance equal to the focal length of the collimating lens to collimate said beam, an objective lens aligned on the optical axis of said system and with an eye to be examined, said objective lens being focused on said eye, a pair of flat mirrors optically and serially aligned on said optical axis between said collimating and said objective lens to project the beam from the collimating lens to the objective lens, said mirrors being mounted substantially parallel to each other and inclined to said beam, one of said mirrors being fixed in an oblique position across the diameter of the entrance surface of the objective lens and the other mirror being movable rectilinearly in the direction of said beam coming from the collimating lens, whereby the movement of the movable mirror causes said beam to strike the fixed mirror at different vertical heights and be reflected into the objective lens at different radial distances from its axis which results in the beam being refracted at different incidence angles into said eye.

9. An illuminating system for a slit lamp device which is used for ophthalmic purposes, said system comprising, a lamp, condenser and a slit mechanism aligned therewith for forming a relatively small and narrow beam of light, a collimating lens optically aligned at a distance of its focal length with said mechanism to collimate said beam, an objective lens optically aligned with said collimating lens and aligned with an eye to be examined the eye being situated substantially at the focal point of said objective lens, a pair of flat mirrors which are aligned to deflect the collimated light beam from the collimating lens to the objective lens, said mirrors being mounted substantially parallel to each other and inclined to said beam, one of said mirrors being mounted inclined to and facing the entrance of said objective lens and being movable rectilinearly along said beam across said surface, whereby movement of the mirror causes the beam to enter the objective lens at different radial positions from its axis which results in the beam being deviated at different incidence angles by the last lens into said eye.

10. A slit lamp device for ophthalmic examination of an eye, said device being characterized by the combination of a lamp and a slit-shaped diaphragm optically aligned therewith for forming a relatively narrow beam of light, a collimating lens which is optically aligned at its focal length from and with said diaphragm so as to form a collimated beam, an objective lens aligned to view said eye which is situated substantially at the focal point of the lens, a first flat mirror on the upper part of which a semi-reflective semi-transmitting coating is formed, said mirror being positioned obliquely across the entrance surface of said objective lens, a second flat mirror positioned obliquely to said beam between the first mirror and said collimating lens so as to deviate said beam from the last-named lens upon the first mirror, one of said mirrors being movable rectilinearly axially along said beam and with reference to the other mirror along the portion of the beam which is incident thereon so that the lateral position relative to the optical axis of said objective lens of incidence of said beam on the first mirror may be moved therealong and subsequently the beam may be reflected through the objective lens at a variable distance from the axis thereof, a viewing instrument aligned to view said eye through said first mirror and around said objective lens, whereby the beam may be selectively focused by various radial zones of the objective lens and thereby deviated at various angles of incidence upon said eye for observation by said instrument.

References Cited

UNITED STATES PATENTS

| | | | |
|---|---|---|---|
| 2,424,363 | 7/1947 | Miller | 351—8 |
| 2,999,422 | 9/1961 | Papritz | 351—4 |
| 2,812,685 | 11/1957 | Vossberg. | |

FOREIGN PATENTS 996,621   8/1962   Great Britain.

DAVID SCHONBERG, *Primary Examiner.*

P. R. GILLIAM, *Assistant Examiner.*